United States Patent
Argo et al.

(10) Patent No.: US 9,371,811 B2
(45) Date of Patent: Jun. 21, 2016

(54) METHODS AND SYSTEMS FOR OPERATING A GAS TURBINE ENGINE

(71) Applicants: Rolls-Royce North American Technologies, Inc., Indianapolis, IN (US); Rolls-Royce Corporation, Indianapolis, IN (US)

(72) Inventors: Peter H. Argo, Indianapolis, IN (US); Thomas J. Ronan, Mooresville, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 58 days.

(21) Appl. No.: 14/132,809

(22) Filed: Dec. 18, 2013

(65) Prior Publication Data
US 2015/0001856 A1 Jan. 1, 2015

Related U.S. Application Data

(60) Provisional application No. 61/801,868, filed on Mar. 15, 2013.

(51) Int. Cl.
*F02N 11/08* (2006.01)
*F01D 19/00* (2006.01)
*F01D 25/00* (2006.01)

(52) U.S. Cl.
CPC .............. *F02N 11/08* (2013.01); *F01D 19/00* (2013.01); *F01D 25/002* (2013.01); *F05D 2260/85* (2013.01); *F05D 2270/052* (2013.01); *F05D 2270/335* (2013.01); *Y02E 20/16* (2013.01)

(58) Field of Classification Search
CPC ....... F02N 11/08; F01D 25/002; F01D 19/00; Y02E 20/16; F02D 2200/10; F02D 2200/1002; F02D 2200/1004; F02D 2250/18; F02D 2200/101; F02D 2200/041; F02D 2200/042; F02D 2300/102; F02D 2300/104
See application file for complete search history.

(56) References Cited

U.S. PATENT DOCUMENTS

| | | | |
|---|---|---|---|
| 4,274,255 A | | 6/1981 | Pollak |
| 6,035,626 A | * | 3/2000 | Wahl ...................... F02C 7/275 290/40 A |
| 6,076,503 A | * | 6/2000 | Carpenter ..................... 123/438 |
| 6,153,942 A | | 11/2000 | Roseman et al. |
| 6,158,405 A | * | 12/2000 | Masberg et al. ........... 123/192.1 |
| 6,379,280 B1 | * | 4/2002 | Ogawa et al. ................. 477/107 |
| 7,062,370 B2 | | 6/2006 | Vhora et al. |

(Continued)

FOREIGN PATENT DOCUMENTS

| | | |
|---|---|---|
| EP | 2390485 A2 | 11/2011 |
| JP | 2003083086 A | 3/2003 |

OTHER PUBLICATIONS

International Search Report for PCT/US2013/073186 mailed Sep. 15, 2014.

(Continued)

*Primary Examiner* — Tulsidas C Patel
*Assistant Examiner* — Viet Nguyen
(74) *Attorney, Agent, or Firm* — Fishman Stewart PLLC

(57) ABSTRACT

A method of operating a gas turbine engine may include operating a starter motor to rotate a spool of the gas turbine engine; determining a torque of the starter motor during rotation of the spool; and controlling the rotation of the spool based on the torque.

13 Claims, 2 Drawing Sheets

(56) References Cited

U.S. PATENT DOCUMENTS

| | | | |
|---|---|---|---|
| 7,208,908 B2 * | 4/2007 | Anghel | 318/400.02 |
| 7,253,535 B2 | 8/2007 | Duesterhoeft | |
| 7,268,521 B1 * | 9/2007 | Prakash et al. | 320/166 |
| 7,285,871 B2 | 10/2007 | Derouineau | |
| 7,332,884 B2 * | 2/2008 | Rozman et al. | 318/432 |
| 7,810,337 B2 | 10/2010 | Baker et al. | |
| 2004/0255904 A1 * | 12/2004 | Izawa et al. | 123/352 |
| 2007/0132245 A1 * | 6/2007 | Duesterhoeft | 290/27 |

OTHER PUBLICATIONS

English Abstract for JP2003083086A.

* cited by examiner

METHODS AND SYSTEMS FOR OPERATING A GAS TURBINE ENGINE

CROSS-REFERENCE TO RELATED APPLICATIONS

This application claims priority to U.S. Provisional Patent Application No. 61/801,868 filed Mar. 15, 2013, the contents of which are hereby incorporated in their entirety.

FIELD OF THE INVENTION

The present disclosure relates to gas turbine engines, and more particularly, to gas turbine engines having controlled electrical machines.

BACKGROUND

It has become increasingly desirable to improve the overall system design and operation of gas turbines. In a system having a typical gas turbine engine, electrical power is extracted via an electrical machine to supply electrical power to control systems, actuators, weapon systems, climate control systems, and the like. Gas turbine engines and electrical machines associated therewith remain an area of interest. Some existing systems have various shortcomings, drawbacks, and disadvantages relative to certain applications. Accordingly, there remains a need for further contributions in this area of technology.

BRIEF DESCRIPTION OF THE DRAWINGS

While the claims are not limited to a specific illustration, an appreciation of the various aspects is best gained through a discussion of various examples thereof. Referring now to the drawings, exemplary illustrates are shown in detail. Although the drawings represent illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrates are described in detail by referring to the drawings as follows:

DETAILED DESCRIPTION

Figure 1:
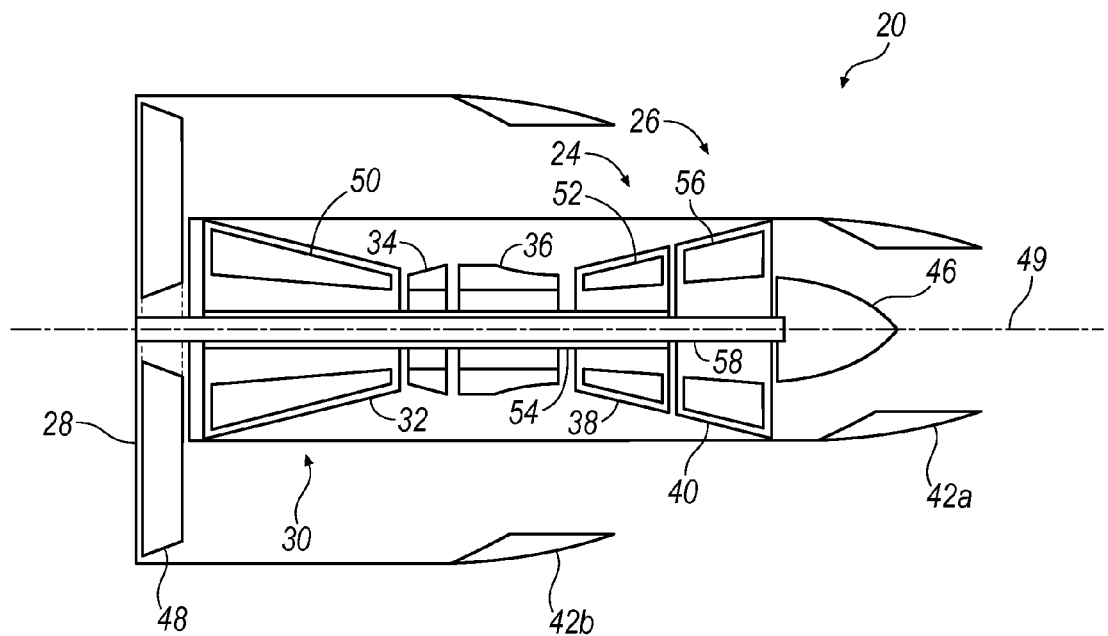
FIG. 1 schematically illustrates a gas turbine engine.

For purposes of promoting an understanding of the principles of the disclosure, reference will now be made to the examples illustrated in the drawings, and specific language will be used to describe the same. It will nonetheless be understood that no limitation of the scope of the disclosure is intended by the illustration and description of certain examples of the disclosure. In addition, any alterations and/or modifications of the illustrated and/or described examples are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

Referring to the drawings, and in particular FIG. 1, there are illustrated some aspects of a non-limiting example of a gas turbine engine 20. In one form, engine 20 is a propulsion engine, e.g., an aircraft propulsion engine. In other examples, engine 20 may be any other type of gas turbine engine, e.g., a marine gas turbine engine, an industrial or power generation gas turbine engine, or any aero, aero-derivative or non-aero derivative gas turbine engine. The engine 20 may be a two spool engine having a high pressure (HP) spool (rotor) 24 and a low pressure (LP) spool (rotor) 26. In other examples, engine 20 may include only a single spool, or may include three or more spools, e.g., may include an intermediate pressure (IP) spool and/or other spools and/or partial spools, e.g., on-axis or off-axis compressor and/or turbine stages (i.e., stages that rotate about an axis that is the same or different than that of the primary spool(s)). In one form, engine 20 is a turbofan engine. In other examples, engine 20 may be any other type of gas turbine engine, such as a turboprop engine, a turboshaft engine, a propfan engine, a turbojet engine or a hybrid or combined cycle engine. As a turbofan engine, LP spool 26 is operative to drive a propulsor 28 in the form of a turbofan (fan) system, which may be referred to as a turbofan, a fan or a fan system. As a turboprop engine, LP spool 26 powers a propulsor 28 in the form of a propeller system (not shown), e.g., via a reduction gearbox (not shown). As a propfan engine, LP spool 26 powers a propulsor 28 in the form of a propfan. In other examples, propulsor 28 may take other forms, such as one or more helicopter rotors or tilt-wing aircraft rotors, for example, powered by one or more engines 20 in the form of one or more turboshaft engines.

According to one example, engine 20 includes, in addition to fan 28, a bypass duct 30, a compressor 32, a diffuser 34, a combustor 36, a high pressure (HP) turbine 38, a low pressure (LP) turbine 40, a nozzle 42A, a nozzle 42B, and a tailcone 46, which are generally disposed about and/or rotate about an engine centerline 49. In other examples, there may be an intermediate pressure spool having an intermediate pressure turbine or other turbomachinery components, such as those mentioned above. In one form, engine centerline 49 is the axis of rotation of fan 28, compressor 32, turbine 38 and turbine 40. In other examples, one or more of fan 28, compressor 32, turbine 38 and turbine 40 may rotate about a different axis of rotation.

In the example illustrated in FIG. 1, engine 20 core flow is discharged through nozzle 42A, and the bypass flow from fan 28 is discharged through nozzle 42B. In other examples, other nozzle arrangements may be employed, e.g., a common nozzle for core and bypass flow; a nozzle for core flow, but no nozzle for bypass flow; or another nozzle arrangement. Bypass duct 30 and compressor 32 are in fluid communication with fan 28. Nozzle 42B is in fluid communication with bypass duct 30. Diffuser 34 is in fluid communication with compressor 32. Combustor 36 is fluidly disposed between compressor 32 and turbine 38. Turbine 40 is fluidly disposed between turbine 38 and nozzle 42A. The combustor 36 may include a combustion liner (not shown) that contains a continuous combustion process. Alternatively, combustor 36 may take other forms, and may be, for example, a wave rotor combustion system, a rotary valve combustion system, a pulse detonation combustion system, a continuous detonation combustion system and/or a slinger combustion system, and may employ deflagration and/or detonation combustion processes.

Fan system 28 includes a fan rotor system 48 driven by LP spool 26. In various examples, fan rotor system 48 may include one or more rotors (not shown) that are powered by turbine 40. In various examples, fan 28 may include one or more fan vane stages (not shown) that cooperate with fan blades (not shown) of fan rotor system 48 to compress air and to generate a thrust-producing flow. Bypass duct 30 is operative to transmit a bypass flow generated by fan 28 around the core of engine 20. Compressor 32 may include a compressor rotor system 50. In various examples, compressor rotor system 50 includes one or more rotors (not shown) that are powered by turbine 38. Compressor 32 also includes a plurality of compressor vane stages (not shown in FIG. 1) that cooperate with compressor blades (not shown) of compressor rotor system 50 to compress air. In various examples, the compressor vane stages may include a compressor discharge vane stage and/or one or more diffuser vane stages. In one form, the compressor vane stages are stationary. In other examples, one or more vane stages may be replaced with one or more counter-rotating blade stages.

Turbine 38 includes a turbine rotor system 52. In various examples, turbine rotor system 52 includes one or more rotors having turbine blades (not shown) operative to extract power from the hot gases flowing through turbine 38 (not shown), to drive compressor rotor system 50. Turbine 38 also includes a plurality of turbine vane stages (not shown) that cooperate with the turbine blades of turbine rotor system 52 to extract power from the hot gases discharged by combustor 36. In one form, the turbine vane stages are stationary. In other examples, one or more vane stages may be replaced with one or more counter-rotating blade stages. Turbine rotor system 52 is drivingly coupled to compressor rotor system 50 via a shafting system 54. Turbine 40 includes a turbine rotor system 56. In various examples, turbine rotor system 56 includes one or more rotors having turbine blades (not shown) operative to drive fan rotor system 48. Turbine 40 also includes a plurality of turbine vane stages (not shown) that cooperate with the turbine blades of turbine rotor system 56 to extract power from the hot gases discharged by turbine 38. In one form, the turbine vane stages are stationary. In other examples, one or more vane stages may be replaced with one or more counter-rotating blade stages. Turbine rotor system 56 is drivingly coupled to fan rotor system 48 via a shafting system 58. In various examples, shafting systems 54 and 58 include a plurality of shafts that may rotate at the same or different speeds and directions for driving fan rotor system 48 rotor(s) and compressor rotor system 50 rotor(s). In some examples, only a single shaft may be employed in one or both of shafting systems 54 and 58. Turbine 40 is operative to discharge the engine 20 core flow to nozzle 42A.

During normal operation of gas turbine engine 20, air is drawn into the inlet of fan 28 and pressurized. Some of the air pressurized by fan 28 is directed into compressor 32 as core flow, and some of the pressurized air is directed into bypass duct 30 as bypass flow. Compressor 32 further pressurizes the portion of the air received therein from fan 28, which is then discharged into diffuser 34. Diffuser 34 reduces the velocity of the pressurized air, and directs the diffused core airflow into combustor 36. Fuel is mixed with the pressurized air in combustor 36, which is then combusted. The hot gases exiting combustor 36 are directed into turbines 38 and 40, which extract energy in the form of mechanical shaft power to drive compressor 32 and fan 28 via respective shafting systems 54 and 58. The hot gases exiting turbine 40 are discharged through nozzle system 42A, and provide a component of the thrust output by engine 20.

Figure 2:
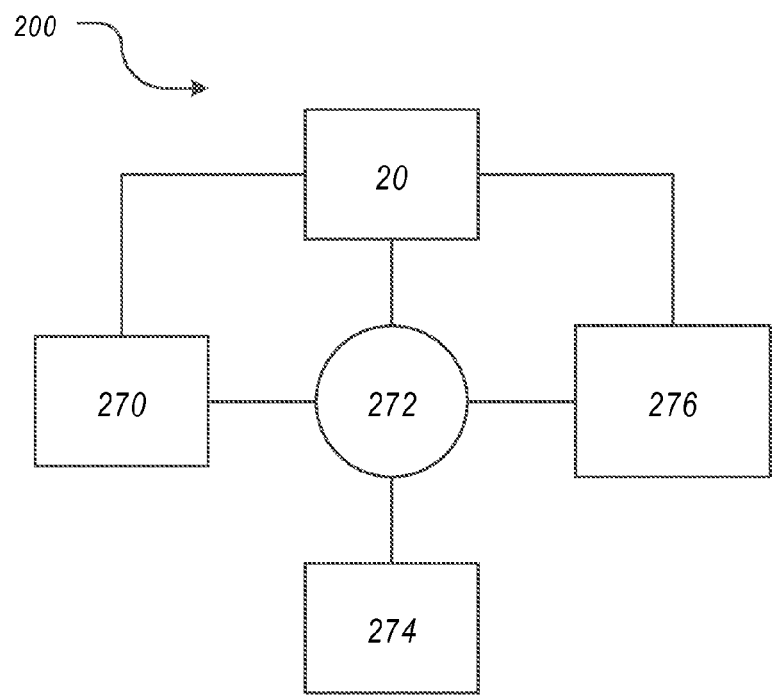
FIG. 2 illustrates an exemplary system for operating a turbine engine.

FIG. 2 illustrates an exemplary system 200 for operating a turbine engine 20. The system may include a controller 272 communicatively coupled to the engine 20, an electrical machine 270, and various sensors and sensor systems 276. That is, the engine 20 may be in communication with a controlled electrical machine 270 and a controller 272 communicatively coupled to controlled electrical machine 270. The controlled electrical machine 270 and the controller 272 may be included with, or separate from, the engine 20. Controlled electrical machine 270 may be configured to start engine 20 (e.g., provide motive power to one or more shafts or rotors in the engine 20), and to motor engine 20, e.g., for performing engine cleaning, such as a water wash. In addition, controlled electrical machine 270 may be configured to apply power to one or more spools or rotors 24, 26 of engine 20 for other purposes, e.g., validation of drag torque curves. In one form, controlled electrical machine 270 is an integral starter generator, and is configured to convert mechanical power produced by engine 20 into electrical power. Further, the controlled electrical machine 270 may be a permanent magnet machine. The controlled electrical machine 270 may likewise be any electrical machine for which an electrical torque may be measured, e.g., via q-axis current monitor and a d-axis current monitor.

The controller 272 may be an engine controller, such as a full authority digital engine controller or any other gas turbine engine controller. Additionally, controller 272 may take other forms, for example and without limitation, a dedicated motor or motor/generator controller, a dedicated engine health monitoring (EHM) system controller, or any other computing machine and/or other form of controller. The controller 272 may include a microprocessor configured with program instructions in the form of software stored in a memory (not shown). For example, the controller 272 may include any computing device configured to execute computer-readable instructions. The controller 272 may be configured to receive various inputs and generate various outputs in accordance with the inputs received or computer-executable instructions maintained in the memory. However, it is additionally contemplated that the controller 272 and program instructions may be in the form of any combination of software, firmware and hardware, including state machines, and may reflect the output of discreet devices and/or integrated circuits, which may be co-located at a particular location or distributed across more than one location, including any digital and/or analog devices configured to achieve the same or similar results as a processor-based controller executing software or firmware based instructions. Controller 272 may be selectively coupled to a second controller 274 for transmitting and/or receiving various data to and/or from controller 274. Controller 274 may be a dedicated engine health monitoring (EHM) system controller, a field health monitoring computer, a repair/overhaul facility computer or a handheld or otherwise portable computer or any other form of computing machine and/or controller. Controller 272 may be configured to perform the functions set forth explicitly or implicitly herein, alone or in conjunction with controller 274, e.g., depending upon the particular function or group of functions to be performed.

The engine 20, controlled electrical machine 270, controller 272, controller 274, and sensors 276 may communicate with each other via an interface (not shown). The interfaces may include an input/output system configured to transmit and receive data from the respective components. The interface may be one-directional such that data may only be transmitted in one direction, e.g., from the controller 272 to the electrical machine 270, or vice versa. Alternatively, the interface may be bi-directional, allowing both receiving and transmitting data between the components.

The system 200 may utilize an electrical machine 270 (e.g., an electrical starter motor) to capture and measure data, such as machine 270 torque, previously inaccessible. Such information may be used to optimize engine start sequences as well as controlled rotation of shaft components (e.g., during engine cleaning operations). Previous starters typically included air turbine starters or brushed DC machine starters. For these starter types, there is no measurement of the applied starting torque. Measurements of torque would require additional instrumentation to either the starter or the engine, as well as acquisition and processing of the torque measurement. Further, there is likewise no measurement of machine current (which could be used to calculate torque, for example) without additional instrumentation.

The system 200 may include a controller 272 operable to perform closed loop control of the electrical machine 270, which may require closing current regulation loops in the electrical frame within machine 270. Closed loop control may provide both d-axis and q-axis current measurements. Given the q-axis current monitor, the d-axis current monitor, and the machine parameters, the electrical torque produced by the electrical machine 270 may be determined via the controller 272 and/or 274. That is, during the engine start cycle—with the inclusion of vector controlled starting machines—it is possible to simultaneously observe the engine rates and the electrical torque from the starter, for example. Additional loads may be present in the dynamic closed looped control system, which may reduce the amount of the electrical torque that gets applied to the engine system. However, the electrical torque may be used to estimate the resulting mechanical torque applied to the engine 20. Given the resultant mechanical torque applied to the engine 20, each engine start may validate the drag curves for a given engine. Accordingly, small changes within the aerodynamic engine system may be identified. The changes may be quantified as a portion of the engine health monitoring (EHM) data set, which may be maintained in the memory, for example. Additionally, the information gathered may be used to fine tune various engine starting events, such that the starting events are tied to quantitative measures of engine characteristics in place of mere time and speed measurements.

Additionally or alternatively, the system 200 may include a controller 272 operable to monitor and/or regulate an electrical machine 270 (e.g., engine starter), for instance, during engine 20 cleaning. That is, the controller 272, via the electrical machine 270, may monitor the speed of rotation of a spool 24, 26 to produce a controlled and repeatable cleaning cycle. Engine 20 cleaning is desired to be performed by cycling the engine rotating section at a reduced speed. By utilizing closed loop control as disclosed above, the controller 272 may be operable to control engine cycling during cleaning via the electrical machine 270. Inclusion of the controlled electrical machine 270 may provide the ability to limit the rotating speed of the complete dynamic system in the frame of the starter. Accordingly, inclusion of the controlled electrical machine 270 may provide repeatable cleaning cycles that exactly meet the desired rotational speed, without manual intervention.

With the inclusion of controlled electrical machines 270 (e.g., controlled at the direction of controller 272 and/or 274), such as electric engine starters and/or starter drives, into the system 200, it may be possible to make a record of torque versus engine speed during start sequences. For instance, torque may be determined based upon measurements of current being passed through the motor windings. That is, sensors (not shown) may detect current in windings of the starter motor and relay the detected data to the controller 272 to determine the torque in response to the sensed current. The torque may be measured during startup of the engine 20 and/or may be measured continuously during the engine 20 startup. Additionally, the engine speed may be determined by measuring the rotational speed of a spool 24, 26, for example.

The measurements may be recorded over a plurality of engine 20 startups to compensate for current phase shifts and/or irregularities. The plurality of records may be combined to create an average record of torque versus speed. The additional information added to the system 200, for example the starter torque, may be used for a number of purposes. For instance, the information recorded during start sequences may be used for refinement of the engine light-off criteria such that engine light-off timing can be directly tied to an amount of power being required to rotate/spin the engine 20. Additionally, sequential records of engine 20 start sequences can be made to potentially augment EHM data records, possibly even identifying failure conditions prior to the point where vibration based techniques are able to identify EHM concerns during high speed engine operations. Moreover, rotation of shaft components, for example during engine cleaning operations, may be performed under electronic control (e.g., via the controlled electrical machine 270 at the direction of the controller 272) which will provide both a regulated speed and the capability to monitor the torque exerted to the rotating components.

Accordingly, the system 200 may provide an indirect measure of the work being performed by the turbine 38, 40 and compressor 32 sections of the engine 20, e.g., in order to improve understanding of engine light-off points in a more general sense, as well as other engine parameters as may be affected or determined based on the operation of the controlled electrical machine 270, e.g., a starter motor and/or generator, integral or discrete. Present engine 20 start approaches do not provide torque feedback, especially air turbine starters. A system 200 including the application of controlled electrical machines 270 as engine starters, machine current measurements can directly indicate electrical machine 270 torques which are being applied to the rotating system. Similarly, by way of the controlled electrical machines 270, the engine speed during cleaning cycles can be directly regulated, via the controller 272, which will assure that the recommended speed profile for the cleaning cycle is always followed, e.g., reducing or eliminating operator errors.

Figure 3:
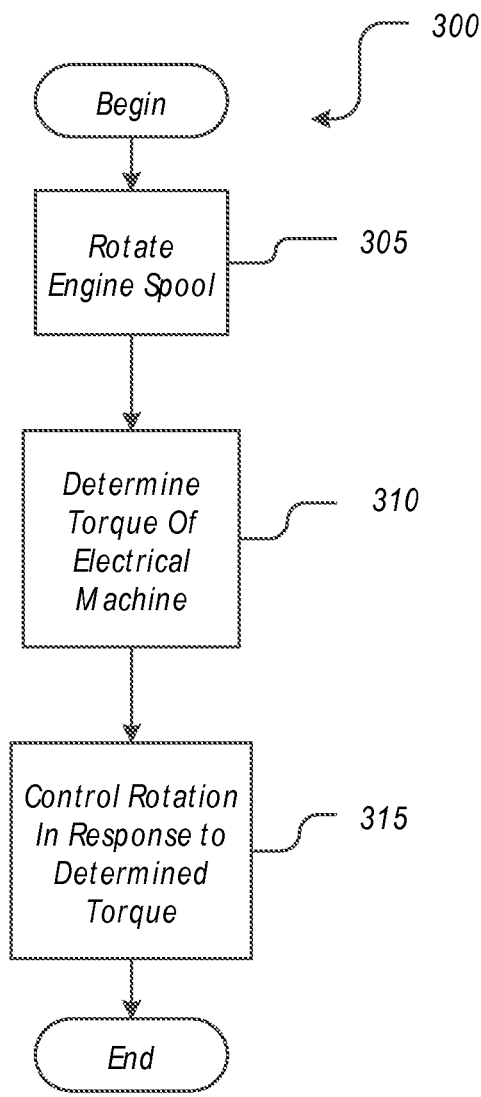
FIG. 3 is an exemplary process for operating a turbine engine.

FIG. 3 illustrates an exemplary process 300 for operating a gas turbine engine. The process begins at block 305. At block 305, the controller 272 may direct the electrical machine 270 to provide motive power to the engine 20. For example, the electrical machine 270, such as a starter motor, may rotate a spool 24, 26 of the turbine engine 20. The rotation may occur during engine startup, and may additionally continue thereafter.

At block 310, torque of the electrical machine 270 may be determined during the rotation of the spool via the controller 272. The torque may be determined by measuring the current, via sensors 276, being passed through the motor windings of the electrical machine 270. Additionally or alternatively, the torque may be determined based on a q-axis current monitor and a d-axis current monitor via closed loop control of the rotating electrical machine 270. Furthermore, the engine speed may be determined during the start event, thereby providing a torque versus speed record. For example, the engine speed may be determined by measuring a speed of rotation of a spool. In order to compensate for phase shifts, irregularities, and/or to broaden the sample size of measurements, the torque and/or speed measurements may be determined during a plurality of engine startup events and complied to determine an average record of speed versus torque. The average record of speed versus torque may then be compared to present engine startup measurements to identify changes of the electrical machine 270. Accordingly, the measurements may be quantified and maintained in an EHM data set, for instance. This data may be used to fine tune various engine starting events, such as reducing start time and/or start temperature.

At block 315, the electrical machine 270 may control, via the controller 272 and/or 274, the rotation of the spool based on the determined torque. For instance, the torque versus speed measurements may determine a desired rotation rate at which the engine rotating sections may be cycled in a controlled and repeatable manner, for example at a reduced rate for engine cleaning. Further, the determined torque may be used to validate drag curves of one or more spools of the turbine engine. As mentioned above, the data quantified in the EHM data set may be used to fine tune or optimize various engine starting events and characteristics. Parameters such as start torque, speed, torque rate, and acceleration may enable more advanced and accurate control over various low-speed engine operations, such as reducing start time, turbine start temperature, and refinement of engine light-off.

The inability of traditional starters, for example air turbine starters and/or brushed DC machine starters, to provide operating feedback results in a reduced capability to optimize the start sequence. The present disclosure identifies areas where control of starter torque, speed, torque rate, and acceleration may provide beneficial to engine operation, and enable a more advanced and more accurate control over various low-speed engine operations. Having control of these additional parameters during the engine starting sequence will lead to reduced start times and turbine start temperature. Reducing these key operating parameters may ultimately lead to extended turbine engine 20 life and increased customer satisfaction.

Therefore, applying the controlled electrical machines 270 to gain additional information about engine performance may consequently increase engine life as a result of early detection of failure conditions and reduced operating parameters (e.g., reduced start times and start turbine temperature). Additionally, utilizing controlled electrical machine 270 capability to maintain better speed regulation during engine cleaning cycles may assure that the recommended speed profile for the cleaning cycle is repeatable and always followed.

Computing devices, such as the controller 272 and/or 274, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method of operating a turbine engine, comprising:
    operating an electrical machine to rotate a spool of the gas turbine engine;
    determining a torque of the electrical machine during rotation of the spool using a starter motor current measurement;
    controlling the rotation of the spool based on the torque;
    simultaneously measuring a speed of rotation of the spool and the starter motor current measurement to determine real time speed versus torque, wherein the speed and torque are maintained as a record of speed versus torque;
    augmenting an engine health monitoring data set with the measured torque and speed; and utilizing the engine health monitoring data set to do at least one of:
reduce turbine engine start up time;
reduce turbine engine start up temperature;
identify turbine engine failure conditions;
adjust for turbine engine aerodynamic changes; or
adjust turbine engine light-off timing.

2. The method of claim 1, further comprising employing closed loop control of the electrical machine based on the determined torque.

3. The method of claim 1, wherein the torque is measured during startup of the turbine engine.

4. The method of claim 3, wherein the torque is measured continuously during startup of the turbine engine.

5. The method of claim 1, wherein the torque and speed are measured during startup of the turbine engine.

6. The method of claim 1, wherein the torque and speed are measured during a plurality of startups of the turbine engine, and wherein the plurality of measurements are compiled to determine an average record of speed versus torque.

7. The method of claim 6, further comprising comparing torque and speed for a present startup of the turbine engine with the average record of speed versus torque.

8. A method of operating a turbine engine, comprising:
determining a torque of an electrical machine during operation of the electrical machine in the turbine engine;
controlling an output of the electrical machine based on the torque;
employing sensors to simultaneously measure current in windings of the electrical machine and measure a speed of rotation of the electrical machine to determine real time speed versus torque, wherein the torque is determined based on the determined current; and
validating drag curves of one or more spools of the turbine engine based on the real time speed versus torque.

9. The method of claim 8, further comprising estimating a mechanical torque based on the determined torque.

10. The method of claim 8, wherein the torque is determined based on a q-axis current monitor and a d-axis current monitor.

11. A method of operating an electrical machine, comprising:
rotating an engine spool during engine startup;
determining a torque representative of an electrical current measurements passing through the electrical machine;
controlling the rotation of the spool in response to the determined torque;
measuring a speed of rotation of a spool while determining the torque, wherein the speed and torque are maintained as a record of speed versus torque;
augmenting an engine health monitoring data set with the measured torque and speed; and
utilizing the engine health monitoring data set to do at least one of:
reduce turbine engine start up time;
reduce turbine engine start up temperature;
identify turbine engine failure conditions;
adjust for turbine engine aerodynamic changes; or
adjust turbine engine light-off timing.

12. The method of claim 11, further comprising employing closed loop control of the electrical machine based on the determined torque.

13. The method of claim 11, wherein the torque is determined in response to d-axis current measurements and q-axis current measurements.

* * * * *